United States Patent [19]

Albinger, Jr. et al.

[11] Patent Number: 4,743,736

[45] Date of Patent: May 10, 1988

[54] SWITCHING APPARATUS FOR AN APPLIANCE CONTROL CIRCUIT

[75] Inventors: Harry Albinger, Jr., Monroe; Michael J. Marchetti, Bridgeport, both of Conn.

[73] Assignee: Black & Decker, Inc., Newark, Del.

[21] Appl. No.: 687,842

[22] Filed: Dec. 31, 1984

[51] Int. Cl.$^4$ ............................................. D06F 75/26
[52] U.S. Cl. ................................ 219/250; 200/159 A; 200/11 DA
[58] Field of Search ............... 219/250, 251, 256, 257; 338/92-96, 118, 179, 200, 202, 215; 200/340, 159 A, 241, 211 DA, 11 TW

[56] References Cited

U.S. PATENT DOCUMENTS

| | | | |
|---|---|---|---|
| 2,985,725 | 5/1961 | Du Vall | 200/11 DA |
| 3,189,696 | 10/1962 | Nuttall | 200/11 D |
| 3,238,319 | 4/1966 | Godel et al. | 200/11 B |
| 3,255,319 | 6/1966 | Paine | 200/11 EA |
| 3,534,184 | 12/1968 | Tabet | 200/4 |
| 4,037,116 | 7/1977 | Hodama | 200/11 DA |
| 4,038,504 | 7/1977 | McAnulty et al. | 200/116 |
| 4,145,585 | 3/1979 | Iwasaki | 200/11 DA |
| 4,314,113 | 2/1982 | Nelson | 200/159 A |
| 4,345,389 | 8/1982 | Balchunas | 219/252 |
| 4,346,272 | 8/1982 | Stoll | 200/159 A |
| 4,388,503 | 6/1983 | Penland et al. | 200/159 A |
| 4,443,670 | 3/1984 | Nakamura et al. | 200/11 DA |

Primary Examiner—Nicholas P. Godici
Assistant Examiner—Karen Skillman
Attorney, Agent, or Firm—Finnegan, Henderson, Farabow, Garrett & Dunner

[57] ABSTRACT

Switching apparatus for an electric iron control circuit includes a control switch assembly having a commutator switch and an on/off switch, including a pair of conductive members mounted on an insulating base. Each of the conductive members includes a plurality of conductive fingers interleaved so as to maintain electrical isolation between the conductive members. A rotary contact geared to the temperature control of an iron includes a contact member which alternately bridges and isolates the conductive fingers such that movement of the temperature select knob creates an interrupting signal between terminals connected to the conductive members. When the movable contact is in a predetermined position, a leaf contact is separated from a fixed contact so as to establish an on/off switch control. The base is pivotally mounted to the housing of the iron. A start switch includes a switch case having a pair of conductive resilient leaves normally electrically isolated and a switch button movably mounted in a switch case such that the movement of the switch button is operative to momentarily contact the two leaves to provide a start signal. The start switch is captured between the housing of the iron and a handle cover.

20 Claims, 5 Drawing Sheets

SWITCHING APPARATUS FOR AN APPLIANCE CONTROL CIRCUIT

BACKGROUND OF THE INVENTION

The invention relates to switching apparatus for an appliance control circuit and, more particularly, to switching apparatus for use with appliances having electronic control circuits.

As the cost of microcomputers continues to decrease, it becomes desirable to provide features for home appliances which were not heretofore economically feasible. Such features include those directed to operating convenience and increased utility as well as features which provide for safer operation of the appliance. A control circuit for an appliance of this type incorporating a microcomputer is described in copending U.S. patent application Ser. No. 687,843 filed 12/31/84 by Thomas O'Loughlin, now U.S. Pat. No. 4,580,038, and assigned to the assignee of the present invention.

In order to provide such features, it is necessary to also provide a method by which the user can conveniently implement the features. Electronic control circuits such as disclosed in the aforementioned patent can advantageously employ switching apparatus including an on-off switch and a commutator switch for producing a series of pulses when the selected temperature of the appliance is varied. However, such switching apparatus must be convenient for the user to operate, must be highly reliable and must be economical to manufacture. It is desirable, therefore, to provide switching apparatus for an appliance control circuit which exhibits these characteristics.

SUMMARY OF THE INVENTION

In accordance with the principles of the present invention, there is provided switching apparatus for an electronic control circuit comprising a plurality of output terminals, a base of electrically insulating material, a movable contact member, a pair of conductive members each electrically connected to one of the output terminals and having a plurality of extending conductive fingers, the conductive members being mounted on the base such that fingers of one of the conductive members are in proximity to fingers of the other of the conductive members and the conductive members are electrically isolated from each other. The apparatus further comprises means biasing the movable contact member into engagement with the fingers such that movement of the movable contact member is operable to alternately electrically connect and disconnect fingers of one of the conductive members with fingers of the other of the conductive members. A series circuit between the output terminals connected to the conductive members is thus alternately established and interrupted when the movable contact member is moved to generate a series of pulses for use by a microcomputer of an appliance control circuit to operate audible and visual status indicators.

In a preferred embodiment of the invention, the switching apparatus is provided in conjunction with an iron comprising a sole plate, a housing attached to the sole plate, a heater operable when energized to heat the sole plate, control means mounted within the housing for controlling the energization of the heater, a temperature select knob mounted on the housing, and means connecting the temperature select knob to the control means. The switching apparatus previously described is mounted within the housing for generating input signals to the control means such that movement of the temperature select knob is operable to supply an interrupting control signal to the control means for use by a microcomputer to operate audible and visual status indicators of the iron to convey temperature status information to a user after the user has selected a new operating temperature for the iron.

In a further preferred embodiment, the iron includes a switch case comprising a base, a back wall perpendicular to the base and extending along a side of the base, and a pair of sidewalls perpendicular to the base and the backwall and extending in the same direction from the base as the backwall, with each of the side walls including a slot. The switch case further comprises means for mounting the switch case on the housing, and an interior wall parallel to the back wall and extending from the base in the same direction as the back wall and connecting the sidewalls. The interior wall defines a switch cavity and a button cavity, and includes means defining a passage between switch cavity and the button cavity, and a rib extending from the base in the same direction as the interior wall and extending from the interior wall into switch cavity. The switch case further comprises a pair of lugs extending from the sidewalls into the button cavity.

The further preferred embodiment also comprises first and second resilient conductive switch leaves seated in the slots and extending into the switch cavity, the first leaf extending along the interior wall across the passage, and the second leaf being biased against the rib and electrically isolated from the first leaf. The further preferred embodiment also comprises a switch button having a length shorter than the distance between the lugs, a pair of ears extending lengthwise from the switch button, and a switch stud extending from the switch button in a direction perpendicular to the ears. The switch button is seated in the button cavity with the switch stud extending through the passage against the first leaf, and the first leaf biasing the switch button in a direction from the switch cavity toward the button cavity such that the ears are held against the lugs.

Actuation of the switch button in a direction from the button cavity towards the switch cavity is operable to move the first leaf into electrical contact with the second leaf against the biasing action of the first leaf. The further preferred embodiment also comprises conductors electically connecting the leaves to the control means, whereby actuation of the switch button to cause electrical contact between the leaves is operable to generate a control signal to the control means. As cover is mounted on the housing so as to capture the switch button between the switch case and the cover.

DESCRIPTION OF THE PREFERRED EMBODIMENT

Reference will now be made in detail to the present preferred embodiment of the invention, an example of which is illustrated in the accompanying drawings.

Figure 1:
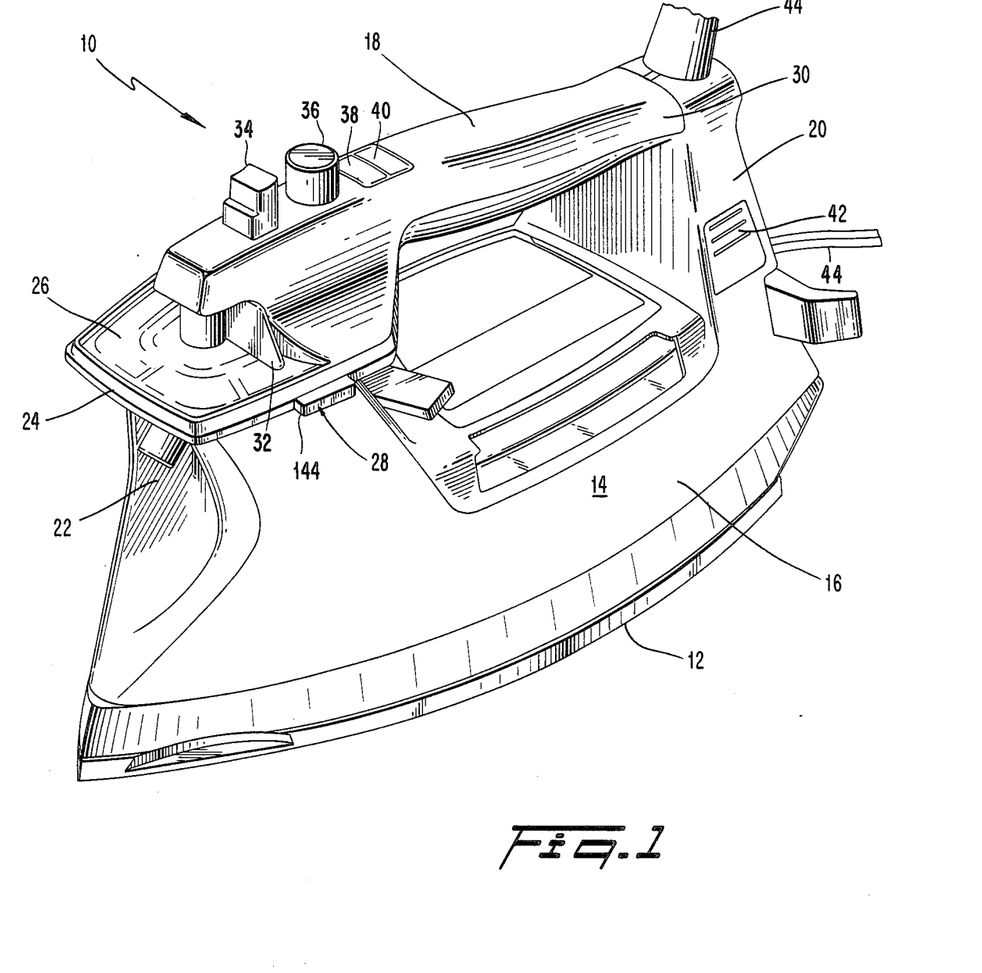
FIG. 1 is a perspective view of an electric iron which is a preferred embodiment of the present invention.

FIG. 1 is a perspective view of an electric iron 10 which includes a preferred embodiment of the present invention. The iron 10 includes a sole plate 12 of cast aluminum on which is mounted a housing 14 of molded plastic. The housing 14 includes a bottom portion 16 and a handle portion 18 connected by a rear pedestal 20 and a throat 22. At the top of the throat 22 is a shelf 24 on which is mounted an indicator plate 26 which indicates the various temperature settings which are possible for the iron 10. A start switch 28 extends from the shelf 24 and is captured against the shelf 24 of the housing throat 22 by a handle cover 30. A temperature selector knob 32 extends from the throat 22 and is movable around the periphery of the indicator plate 26 to establish the desired operating temperature of the iron.

Extending from the handle portion 18 through the handle cover 30 is a steam actuator 34 and steam control button 36 which provide user controls of the steam function of the iron 10. The steam functions of the iron 10 constitute no part of the present invention and thus the controls 34 and 36 will not be discussed in detail. Behind the steam control 36 is a READY indicator 38 and a WAIT indicator 40. The indicators 38 and 40 are alternately illuminated according to whether or not the iron has reached the desired operating temperature.

In the rear pedestal portion 20 of the iron 10 is a grill 42 behind which is an audible transducer which provides a beep indication whenever the READY indicator 38 becomes illuminated. Extending from the rear of the handle portion 18 is a line cord 44.

Figure 2:
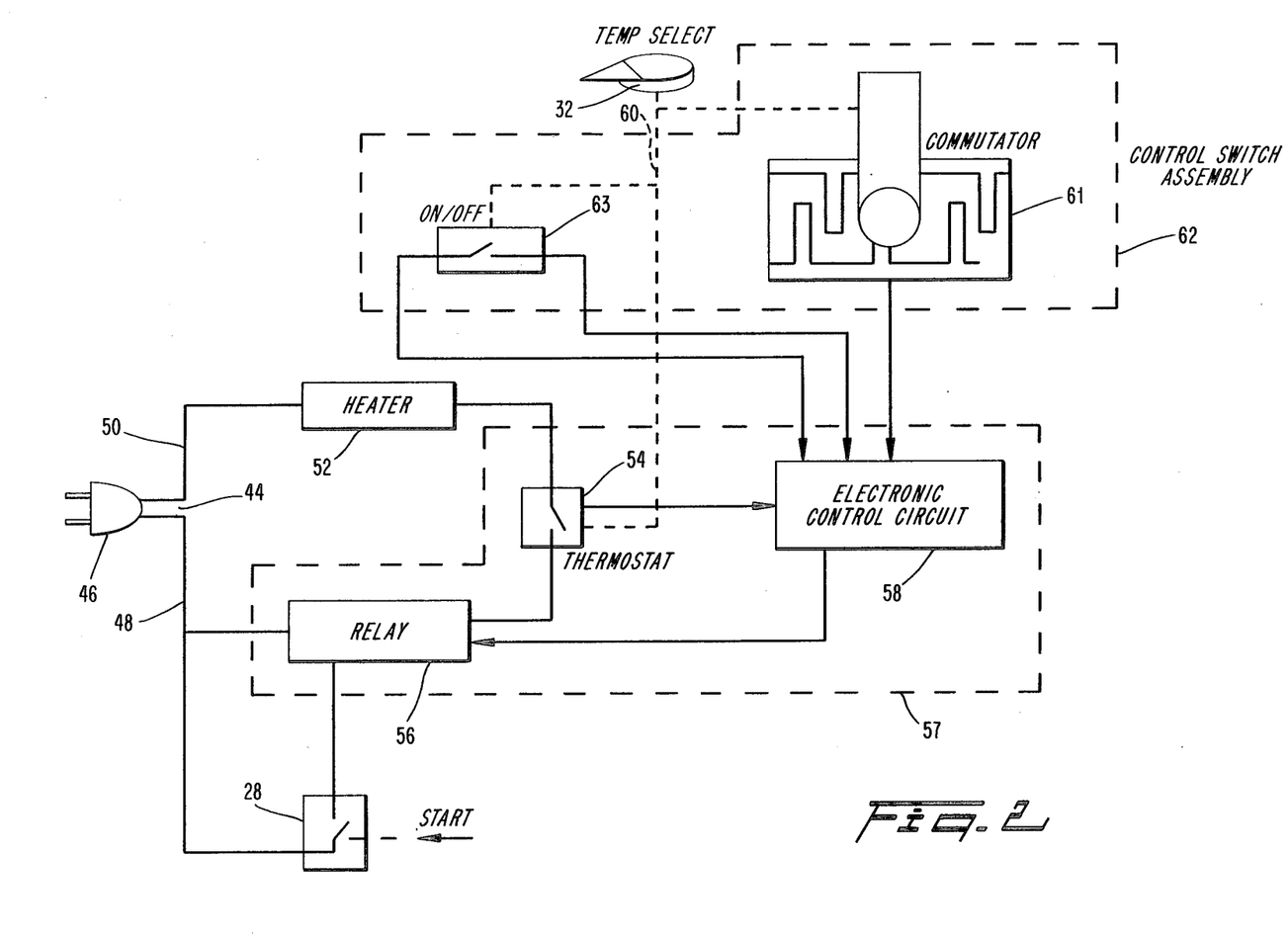
FIG. 2 is a simplified schematic diagram of the iron shown in FIG. 1.

Referring now to FIG. 2, there is shown a simplified schematic diagram of the electrical components of the iron 10. A plug 46 is connected to a pair of line cord leads 48 and 50, one of which is connected to a resistance heater 52. The construction of heater 52 is well-known to those skilled in the art and will not be described in detail. The other terminal of heater 52 is connected to a thermostat 54 which opens and closes a circuit through heater 52 when sole plate 12 is above or below the selected operating temperature, respectively. The other terminal of thermostat 54 is connected to one terminal of a relay 56, the other terminal of which is connected to line cord lead 48.

The invention includes control means 57 mounted within the housing for controlling the heater. As embodied herein, control means 57 includes relay 56, thermostat 54, and an electronic control 58 circuit including a microcomputer. The specific operation of control means 57 is described in greater detail in the aforementioned U.S. Pat. No. 4,580,038. The disclosure of U.S. Pat. No. 4,580,038 is expressly incorporated herein by reference.

As can be seen in FIG. 2, start switch 28 is connected between line cord lead 48 and relay 56 and serves to initiate operation of iron 10 when the contacts of switch 28 are closed. The specific manner in which closure of the contact switch 28 initiates control of the iron 10 is disclosed in greater detail in the aforementioned U.S. Pat. No. 4,580,038.

Temperature select knob 32 is operatively connected to thermostat 54 by connecting means 60 which will be described later in detail. Temperature select knob 32 is also operatively connected to a control switch assembly 62 including a commutator switch 61 and an on/off switch 63. As is disclosed in greater detail in the aforementioned U.S. Pat. No. 4,580,038, operation of temperature select knob 32 is operable to activate on/off switch 63 and to generate a pulse signal to electronic control circuit 58 to provide proper operations of READY and WAIT indicators 38 and 40 following selection of a new operating temperature by temperature select knob 32.

The operation of iron 10 will now be described. When the user removes temperature select knob 32 from the off position, switch 63 closes. However, the circuit is not yet energized since line cord 44 is still effectively isolated from the circuit. When start switch 28 is operated, relay 56 connects line 44 to the remainder the circuit. Movement of temperature select knob 32 from the off position is also operable to cause commutator 61 to generate one or more pulses to electronic control circuit 58. Electronic control circuit 58 then illuminates WAIT indicator 40 to inform the user that the correct operating temperature has not been reached. At this point, contacts of thermostat 54 are closed to connect heater 52 across line cord leads 48 and 50.

When the iron reaches the desired temperature as specified by temperature select knob 32, thermostat 54 opens to deenergize heater 52. Electronic control circuit 58 then causes an audible beep signal to be generated from a transducer behind grill 42. WAIT indicator 40 is then extinguished and READY indicator 38 is illuminated.

If the user desires a different operating temperature for the iron, temperature select knob 32 is moved to cause thermostat 54 to produce the desired operating temperature. In addition, however, movement of temperature select knob 32 operates commutator 61 to generate one or more pulse signals to electronic control circuit 58. Electronic control circuit 58 then extinguishes READY indicator 38 and illuminates WAIT indicator 40.

When the user desires to turn off the iron, temperature select knob 32 is moved to the off position, opening switch 63 and deenergizing the iron.

Figures 3, 4, 5:
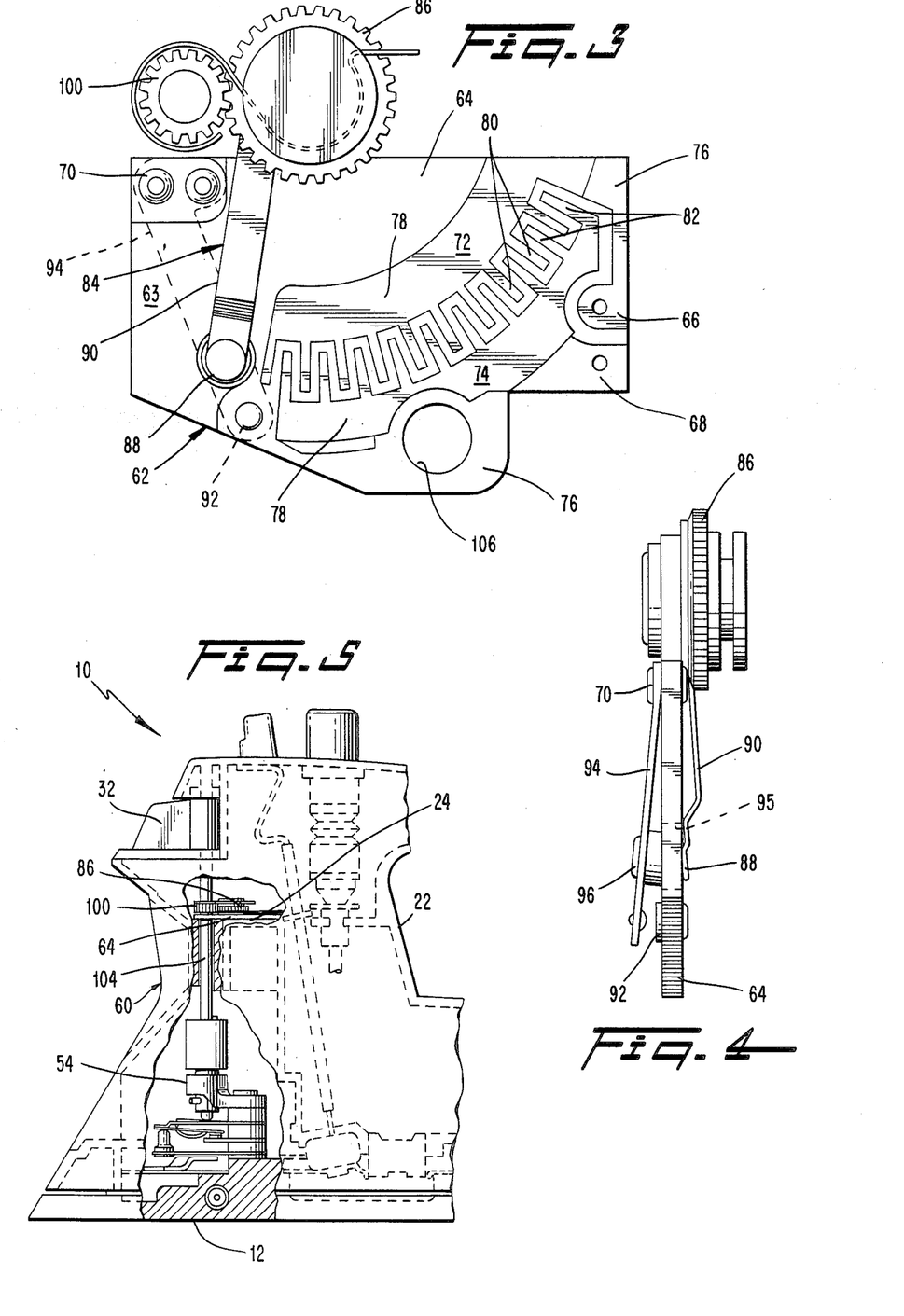
FIG. 3 is a top view of the control switch assembly shown in FIG. 2.
FIG. 4 is a side view of the control switch assembly shown in FIG. 3.
FIG. 5 is a partial side view of the iron shown in FIG. 1.

Control switch assembly 62 is shown in greater detail in FIG. 3. As can be seen, control switch assembly 62 includes a base 64 of electrically insulating material. In the preferred embodiment, base 64 is composed of printed circuit board material such as, for example, glass polyester. Base 64 includes output terminals 66, 68, and 70. Assembly 62 also includes a pair of conductive members 72 and 74 fixed to base 64. Conductive members 72 and 74 each include a portion 76 of conductive metal foil as is commonly utilized in printed circuit board construction. However, members 72 and 74 also preferably include portions 78 of conductive ink which is screened in a desired pattern onto base 64. Conductive ink portions 78 may be printed onto base 64 using a conductive resin such as Product No. 441-010 obtainable from the Insulating Materials Business Unit of the General Electric Corporation. This material yields a high resolution pattern on base 64 and exhibits a constant non-oxidizing surface contact resistance, low surface friction, and low wear rate, thus yielding a highly reliable assembly. However other types of conductive materials may be used for conductive portions 78.

As can be seen in FIG. 3, each of the conductive members 72 and 74 includes a plurality of extending conductive fingers 80 and 82, respectively. The fingers 80 and 82 are interleaved, with the fingers 80 of conductive member 72 being situated between adjacent fingers 82 of conductive members 74. Since fingers 80 and 82 are screened onto insulating base 64, fingers 80 and 82 are electrically isolated from each other.

Assembly 62 also includes a movable contact member 84 which is asymmetrically attached to a gear 86, gear 86 being pivotally attached to base 64. The invention includes means biasing the movable contact member 84 into engagement with fingers 80 and 82 such that movement of the movable contact member 84 is operable to electrically connect and disconnect fingers of one of the conductive members 72, 74 with the fingers of the other conductive member. As embodied herein, the biasing means comprises a resilient arm portion 90 which urges a conductive bridging portion 88 into contact with fingers 80 and 82. It can be seen, therefore, that rotation of gear 86 in a counterclockwise direction is operable to move bridging portion 88 across fingers 80 and 82 to alternately electrically connect and disconnect conductive members 72 and 74 such that a series circuit is alternately established and interrupted between terminals 66 and 68 when movable contact member 84 is rotated.

The invention also includes on/off switch means 63 being actuated to break electrical contact between one of the terminals and one of the conductive members, and movable contact member 84 comprises means for actuating the on/off switch means when movable contact member 84 is moved to a predetermined position. As embodied herein, on/off switch means 63 comprises a fixed contact member 92 located on the underside of base 64 as seen in FIG. 2. Fixed contact 92 is a rivet which establishes mechanical and electrical contact to base 64 and conductive member 74, respectively. On/off switch means 63 further includes a switchblade 94 of resilient conductive material such as nickel silver which is biased into engagement with fixed contact member 92. Switchblade 94 also includes an insulating member comprising a button 96 of insulating material such as nylon which is attached to switchblade 94 and which extends through an aperture 95 in base 64 such that switchblade 94 is normally in electrical contact with fixed contact member 92 to establish an electrical connection between conductive member 74 and output terminal 70. However, when movable contact member 84 is rotated such that bridging portion 88 is in contact with insulating button 96 (as shown in FIG. 3), the biasing action of arm 90 of movable contact member 84 engages button 96 to lift switchblade 94 from contact with fixed contact 92 and thus interrupt a series circuit between conductive members 74 and output terminal 70.

As can be seen in FIG. 3, a second gear 100 engages gear 86. Engagement is maintained by a spring 102 which urges the teeth of gear 100 into engagement with the teeth of gear 86. In the preferred embodiment, gears 86 and 100 each include teeth having standard American Gear Manufacturing Association (AGMA) gear tooth form so that gears 86 and 100 contact their working surfaces and will not bottom at the roots. As can be seen, gear 100 has fewer teeth than gear 86. In the preferred embodiment, a gear reduction of 5:2 between gear 86 and gear 100 is obtained so that rotation of gear 100 through an angle of 210° results in a rotation of gear 86 of only 84°. Additional details of the construction of switch assembly 62 are shown in FIG. 4.

Referring now to FIG. 5, a partial side view of iron 10 is shown. Thermostat 54 is attached to sole plate 12. Thermostat 54 may be, for example, a stacked snap-acting thermostat assembly as disclosed in U.S. Pat. No. 4,345,389.

The invention includes means connecting temperature select knob 32 to control means 57. As embodied herein, connecting means 60 includes a connecting shaft 104 extending between temperature select knob 32 and thermostat 54. As set forth in U.S. Pat. No. 4,345,389, thermostat 54 provides different operating temperatures for iron 10 depending on the rotational position of shaft 104. Gear 100 constitutes a pinion in which teeth are formed directly into shaft 104. Base 64 is mounted in throat 22 in the position shown in FIG. 5. The invention further includes means coupling connecting means 60 to movable contact member 84. As embodied herein, the coupling means includes gear 86, gear 100, and spring 102.

Figure 6:
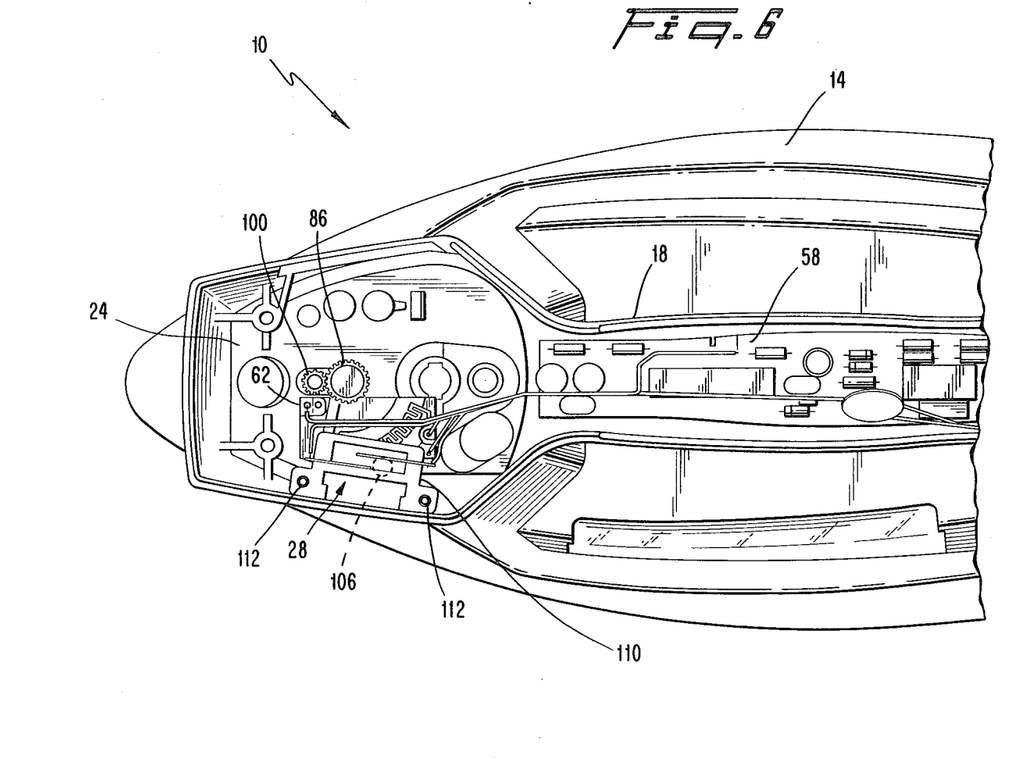
FIG. 6 is a top view of the iron shown in FIG. 1.

Referring now to FIG. 6, a top view of iron 10 is shown. As can be seen, gear 100 engages gear 86 such that rotation of shaft 104 by operation of temperature select knob 32 will cause corresponding rotation of gear 86. However, shaft 104 may be quite eccentric, and its bearing locations may not be closely controlled. Therefore, it is desired that means be provided for maintaining engagement of gears 86 and 100 without backlash. To this end, assembly 62 is attached to the interior of throat 22 with a pivotal connection through an aperture 106 so that gear 86 will follow the motions of gear 100 and maintain a no-backlash condition; that is, base 64 is pivoted at aperture 106 so that it can "float" to maintain engagement of gears 86 and 100.

Iron 10 is assembled so that when temperature select knob 32 is in the OFF position, the positioning of gear 86 causes movable contact member 84 to be positioned such that bridging portion 88 engages insulating button 96 and electrically disconnects terminal 70 from terminal 68. As explained in detail in the aforementioned copending U.S. patent application, such disconnection is operative to deenergize the entire iron 10.

As can be seen in FIG. 1, start switch 28 is located at the junction between housing 14 and handle cover 30. Start switch 28, shown in greater detail in FIG. 6, includes a switch case 110 mounted on tapered studs 112 extending from shelf 24 of housing 14, each of which include a plurality of crushable ribs.

Figures 7, 8:
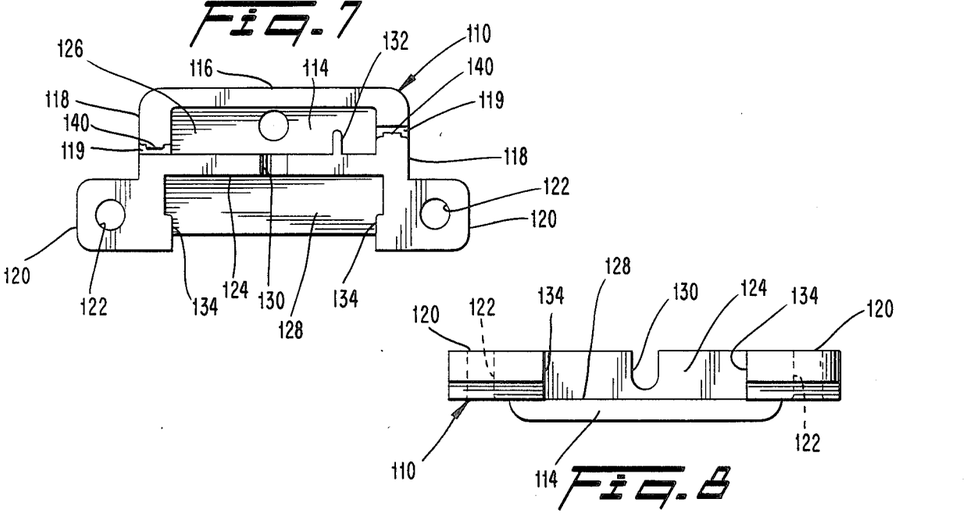
FIG. 7 is a top view of a switch case of the start switch shown in FIG. 1.
FIG. 8 is a side view of the switch case shown in FIG. 7.

Switch case 110 is shown in detail in FIGS. 7 and 8 which are top views and side views, respectively, of switch case 110. As can be seen in these figures, switch case 110 includes a base 114 and a backwall 116 perpendicular to and extending along one side of base 114. Switch case 110 further includes a pair of sidewalls 118 perpendicular to base 114 and backwall 116 and extending in the same direction from base 114 as backwall 116. Each of the side walls 118 includes a slot 119.

The invention includes means from mounting switch case 110 on housing 14. In the preferred embodiment, the mounting means comprises a pair of mounting members 120 extending from sidewalls 118 and each including an aperture 122. Apertures 122 are sized to mount upon studs 112, in a manner to be more completely described.

Switch case 110 further includes an interior wall 124 parallel to backwall 116 and extending from base 114 in the same direction as backwall 116. Interior wall 124 connects sidewalls 118 to define a switch cavity 126 and a button cavity 128. Interior wall 124 includes means defining a passage 130 between switch cavity 126 and button cavity 128. Interior wall 124 further includes a rib 132 extending from base 114 in the same direction as interior wall 124 and extending from interior wall 124 into switch cavity 126. Switch case 110 further includes a pair of lugs 134 extending from sidewalls 118 into button cavity 128.

Figure 9:
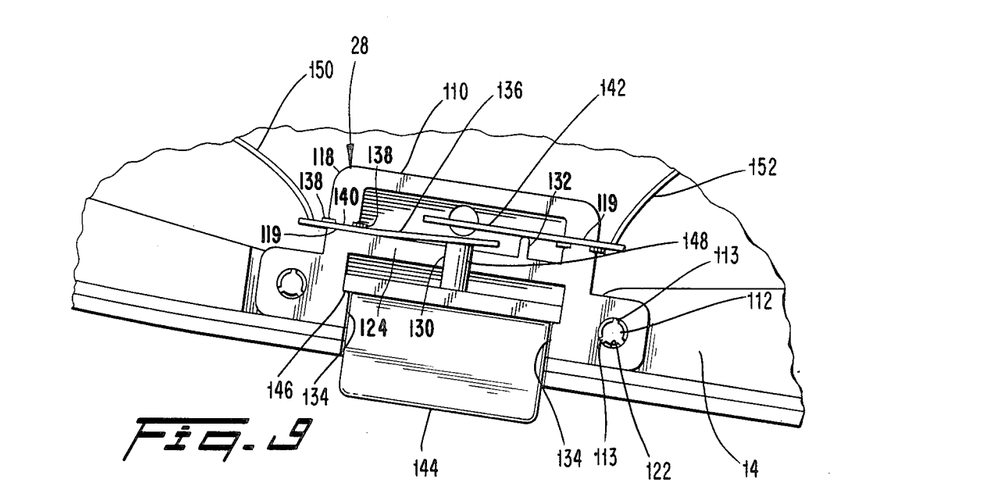
FIG. 9 is a top view of the start switch shown in FIG. 1.

Referring now to FIG. 9, the relationship of start switch 28 to housing 14 is shown in detail. Switch case 110 is positioned such that apertures 122 of mounting members 120 receive studs 112 of housing 14 such that crushable ribs 113 of studs 112 are deformed against the interior sidewalls of apertures 122 to affect a press fit. Switch 128 can thus be easily assembled onto housing 112 but can also be disassembled for repair or replacement.

Figure 10:
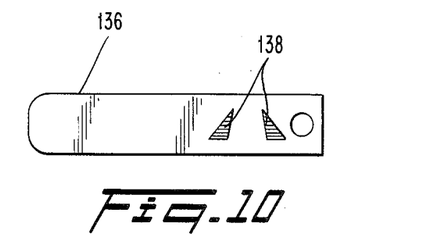
FIG. 10 is a front elevational view of a switch leaf shown in FIG. 9.
Figure 11:
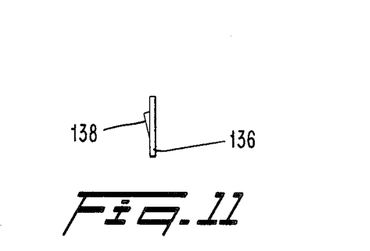
FIG. 11 is an end view of the switch leaf shown in FIG. 10.

As can be seen in FIG. 9, a first leaf spring 136 of resilient conductive material such as nickel silver is press fitted into a slot 119 of a side wall 118 such that leaf 136 extends along interior wall 124 across passage 130. As can be seen in FIGS. 10 and 11, leaf 136 includes lancings 138 which embrace sides of a projection 140 in slots 119. Lancings 138 dig into the radius of the wall of the slot 119 where the slot thickness changes, and once pressed in are firmly held in place.

A second leaf 142 of similar material and construction to leaf 36 is similarly mounted into the other slot 119. Second leaf 122 is biased against rib 132 and electrically isolated from first leaf 136.

Referring once again to FIG. 9, switch 28 further includes a switch button 144 having a length shorter than the distance between lugs 134. Switch button 144 includes a pair of ears 146 extending lengthwise from switch button 144. Switch button 144 also includes a switch stud 148 extending from switch button 144 in the direction perpendicular to ears 146. Switch button 144 is seated in button cavity 128 with switch stud 148 extending through passage 130 against first leaf 136. First leaf 136 biases switch button 144 in the direction from switch cavity 126 toward button cavity 128 such that ears 146 are held against lugs 134. Actuation of switch button 144 in a direction from button cavity 128 toward switch cavity 126 is operable to move first leaf 136 into electrical contact with second leaf 142 against the biasing action of first leaf 136. Conductors 150 and 152 are connected to the first and second leaves, respectively, to connect leaves 136 and 142 to control means 57 such that actuation of switch button 144 is operable to generate a control signal to control means 57.

As can be seen in FIG. 1, handle cover 30 is mounted on the housing 14 so as to capture switch button 144 between switch case 110 and handle cover 30. Switch button 144 is thus able to freely move in a direction parallel to the plane of base 114 between lugs 134 and interior wall 124. Base 114 and handle cover 30 serve to prevent movement of switch button 144 in a direction perpendicular to the plane of base 114.

It will be apparent to those skilled in the art that various modifications and variations can be made in the switching apparatus of the present invention without departing from the scope or spirit of the invention. Thus, it is intended that the present invention cover the modifications and variations of this invention provided they come within the scope of the appended claims and their equivalents.

What is claimed is:

1. An iron, comprising:
    a sole plate;
    a housing attached to said sole plate;
    a heater operable when energized to heat said sole plate;
    control means mounted within said housing for controlling energization of said heater;
    a temperature select knob mounted on said housing;
    means connecting said temperature select knob to said control means; and
    a control switch assembly mounted within said housing for generating input signals to said control means, said control switch assembly comprising:
    a plurality of output terminals,
    a base of electrically insulating material,
    a movable contact member,
    a pair of conductive members each electrically connected to one of said output terminals and having a plurality of extending conductive fingers, said conductive members being mounted on said base such that fingers of one of said conductive members are in proxmity to fingers of the other of said conductive members, and said conductive members are electrically isolated from each other,
    means biasing said movable contact member into engagement with said fingers such that movement of said movable contact member is operable to alternately electrically connect and disconnect fingers of one of said conductive members with fingers of the other of said conductive members; and
    conductors electrically connecting said output terminals to said control means, and means coupling said connecting means to said movable contact member;
    whereby movement of said temperature select knob is operable to supply an interrupting control signal to said control means.

2. Apparatus as recited in claim 1 wherein said movable contact member comprises a rotary contact pivotally connected to said base, and said means connecting said shaft to said rotary contact comprises a first gear connected to said shaft and a second gear connected to said rotary contact and engaging said first gear.

3. Apparatus as recited in claim 2 wherein said first and second gears are of unequal size.

4. Apparatus as recited in claim 3 wherein said first gear is smaller than said second gear.

5. Apparatus as recited in claim 1 wherein said rotary contact is asymmetrically connected to said second gear.

6. Apparatus as recited in claim 1 wherein said gears are formed with standard AGMA gear tooth form.

7. Apparatus as recited in claim 1 wherein said biasing means comprises a spring.

8. Apparatus as recited in claim 7 wherein said spring comprises a leaf spring having a first loop coiled around said first gear and a second loop coiled around said second gear.

9. Apparatus as recited in claim 1 wherein said base is pivotally connected to said housing.

10. Apparatus as recited in claim 1 further comprising first, second, and third output terminals, and on/off switch means operable when actuated to break electrical contact between one of said terminals and one of said conductive members, and wherein said conductive members are connected to said first and second output terminals, said on/off switch means is connected between said second and third output terminals and said movable contact member comprises means for actuating said on/off switch means when said movable contact member is moved to a predetermined position.

11. Apparatus as recited in claim 10 wherein said on/off switch means comprises a fixed contact member, a switchblade biased into engagement with said fixed contact member, and an insulating member attached to said switchblade and extending through said base; said movable contact member being mounted on the opposite side of said base from said switchblade so as to engage said insulating member and disconnect said switchblade from said fixed contact when said movable contact member is operated to said predetermined position.

12. Apparatus as recited in claim 11 wherein said movable contact member comprises a rotary contact member pivotally connected to said base.

13. Apparatus as recited in claim 1 wherein said base is pivotally connected to said housing.

14. An iron, comprising:
a sole plate;
a heater adapted to heat said sole plate;
a housing attached to said sole plate;
electronic control means mounted within said housing for controlling said heater;
a switch case comprising:
  a base,
  a back wall perpendicular to said base and extending along a side of said base;
  a pair of side walls perpendicular to said base and said back wall and extending in the same direction from said base as said back wall, each of said side walls including a slot;
  means for mounting said switch case on said housing;
  an interior wall parallel to said back wall extending from said base in the same direction as said back wall and connecting said side walls, said interior wall defining a switch cavity and a button cavity, said interior wall including means defining a passage between said switch cavity and said button cavity, said interior wall further including a rib extending from said base in the same direction as said interior wall and extending from said interior wall into said switch cavity; and
  a pair of lugs extending from said side walls into said button cavity;
first and second resilient conductive switch leaves seated in said slots and extending into said switch cavity, said first leaf extending along said interior wall across said passage defining means and said second leaf being biased against said rib and electrically isolated from said first leaf;
a switch button having a length shorter than the distance between said lugs, a pair of ears extending lengthwise from said switch button, and a switch stud extending from said switch button in a direction perpendicular to said ears, said switch button being seated in said button cavity with said switch stud extending through said passage defining means against said first leaf, said first leaf biasing said switch button in a direction from said switch cavity toward said button cavity such that said ears are held against said lugs, actuation of said switch button in a direction from said button cavity toward said switch cavity being operable to move said first leaf into electrical contact with said second leaf against the biasing action of said first leaf;
conductors electrically connecting said leaves to said control means, whereby actuation of said switch button to cause electrical contact between said leaves is operable to generate a control signal to said control means; and
a cover mounted on said housing so as to capture said switch button between said switch case and said cover.

15. An iron as recited in claim 14 wherein said mounting means comprises a plurality of molded studs extending from said housing each having a plurality of crushable ribs extending therefrom, and means attached to said switch case defining a plurality of apertures each receiving one of said molded studs and establishing a press fit when said molded studs are inserted into said apertures to crush said crushable ribs.

16. Switching apparatus for an appliance control circuit, comprising:
a plurality of output terminals;
a base of electrically insulating material;
a movable contact member;
a pair of conductive members each electrically connected to one of said output terminal and having a plurality of extending conductive fingers, said conductive members being mounted on said base such that fingers of one of said conductive members are in proximity to fingers of the other of said conductive members and said conductive members are electrically isolated from each other;
on/off switch means for being actuated to break electrical contact between one of said terminals and one of said conductive members, said movable contact member comprising means for actuating said on/off switch means when said movable contact member is moved to a predetermined position; and
means biasing said movable contact member into engagement with said fingers such that movement of said movable contact member is operable to alternately connect and disconnect fingers of one of said conductive members with fingers of the other of said conductive members;
whereby a series circuit between said output terminals connected to said conductive members is alternately established and interrupted when said movable contact member is moved.

17. Apparatus as recited in claim 16 wherein said conductive members comprise conductive resin affixed to said base.

18. Apparatus as recited in claim 17 comprising first, second, and third output terminals, wherein said conductive members are connected to said first and second output terminals, and said on/off switch means is connected between said second and third output terminals.

19. Apparatus as recited in claim 18 wherein said on/off switch means comprises a fixed contact member, a switchblade biased into engagement with said fixed contact member, and an insulating member attached to said switchblade and extending through said base; said movable contact member being mounted on the opposite side of said base from said switchblade and engaging said insulating member and disconnecting said switchblade from said fixed contact when said movable contact member is operated to said predetermined position.

20. Apparatus as recited in claim 18 wherein said movable contact member comprises a rotary contact pivotally connected to said base.

* * * * *